(12) United States Patent
Kilaas et al.

(10) Patent No.: US 8,765,647 B2
(45) Date of Patent: Jul. 1, 2014

(54) METHOD AND CHEMICAL AGENT FOR REDUCTION OF WATER PRODUCTION FROM OIL AND GAS CONTAINING WELLS

(75) Inventors: Lars Kilaas, Trondheim (NO); Einar Dahl-Jörgensen, Stavanger (NO)

(73) Assignee: Wellcem Innovation AS, Trondheim (NO)

( * ) Notice: Subject to any disclaimer, the term of this patent is extended or adjusted under 35 U.S.C. 154(b) by 220 days.

(21) Appl. No.: 12/297,982

(22) PCT Filed: Apr. 26, 2007

(86) PCT No.: PCT/NO2007/000144
§ 371 (c)(1),
(2), (4) Date: Feb. 13, 2009

(87) PCT Pub. No.: WO2007/126318
PCT Pub. Date: Nov. 8, 2007

(65) Prior Publication Data
US 2009/0275489 A1  Nov. 5, 2009

(30) Foreign Application Priority Data
Apr. 26, 2006  (NO) .................................. 20061847

(51) Int. Cl.
| C09K 8/60 | (2006.01) |
| C09K 8/68 | (2006.01) |
| C09K 8/528 | (2006.01) |
| C09K 8/588 | (2006.01) |
| E21B 43/16 | (2006.01) |

(52) U.S. Cl.
USPC ........... 507/219; 507/209; 507/224; 507/225; 507/901; 507/902; 507/903; 166/305.1

(58) Field of Classification Search
CPC ...... C09K 8/92; C09K 8/685; Y10S 507/901; Y10S 507/902; Y10S 507/903
USPC .......... 507/209, 219, 224.225, 902, 903, 901; 166/305.1
See application file for complete search history.

(56) References Cited

U.S. PATENT DOCUMENTS

| 4,670,166 A * | 6/1987 | McDougall et al. .......... 507/224 |
| 4,913,935 A * | 4/1990 | Lin ............................... 427/221 |
| 5,735,349 A | 4/1998 | Dawson et al. |
| 6,454,003 B1 | 9/2002 | Chang et al. |
| 2004/0071715 A1* | 4/2004 | Schwendeman et al. .. 424/184.1 |
| 2004/0074646 A1 | 4/2004 | Kotlar et al. |

FOREIGN PATENT DOCUMENTS

| WO | 01/96707 A1 | 12/2001 |
| WO | 02/14453 A1 | 2/2002 |

OTHER PUBLICATIONS

International Search Report and Written Opinion, dated Jul. 11, 2007, for PCT/NO2007/000144.
Supplementary European Search Report, dated Mar. 5, 2010, for EP 0774605.9.

* cited by examiner

Primary Examiner — Aiqun Li
(74) Attorney, Agent, or Firm — Ladas & Parry LLP

(57) ABSTRACT

Method and agent for reducing water production from oil and gas wells. The agent comprises polymer, cross-linked particles which are stable in water-free solvents. The particles are manufactured in an oil-in-oil emulsion and are cross-linked with at least one water-stable cross-linker and at least one water-labile cross-linker. The water-labile cross-linker is chosen so that when it is opened or broken in a reaction with water a hydrophilic seat is formed which increases the particle's ability to swell in water. The particles furthermore comprise a controlled amount of an immobilized chemical compound which by means of the reaction between water and reactive groups in the polymer skeleton, become able to form chemical bonds to another particle, to another reactive seat in the same particle or to another compounds thereby increasing the agent's stability in the formation.

27 Claims, No Drawings

METHOD AND CHEMICAL AGENT FOR REDUCTION OF WATER PRODUCTION FROM OIL AND GAS CONTAINING WELLS

The present invention concerns a chemical agent for reducing water production from subterranean zones surrounding oil and gas wells, comprising polymeric, cross-linked particles which are stable in water-free solvents. The invention furthermore concerns a method for the production such a chemical agent and a method for reducing water production from subterranean zones, particularly in connection with production of oil and/or gas, by use of the chemical agent of the present invention.

BACKGROUND

In oil and gas wells, over time, there is usually also a certain production of water. The water production typically increases with time and may after a while become so large that further production of hydrocarbons is no longer remunerative. The water can be naturally present in the reservoir. It can also be water injected from another well to maintain the production and the pressure in the reservoir. The produced water includes chemical compounds some of which may be harmful for the environment and must be removed before the water eventually may be discharged to the sea.

Some of the chemicals are dissolved in the water from nature's side while others are added and dissolved as production chemicals. Production chemicals are thus included in the produced water and constitute an environmental problem.

Produced water is thus not only an economic disadvantage for the oil companies but also a significant environmental challenge. In many cases produced water is reinjected to maintain the pressure. This also involves costs. The best technical and economical solution would be to shut off the water selectively in the reservoir which is the object of the present agent and method.

The prior art technology in this area covers a broad range of suggestions of use of water swellable polymers to block the flow of water through permeable zones.

There are water swellable polymers based on positively or negatively charged (ion active) monomers and polymers based on non ion active monomers. Some polymers are particulate during injection but are stretched out to linear polymers when swelled in water. Some of these can again have functional groups like $PO_4$, which are intended to form some kind of bond (hydrogen bond or ion bond) or adhesion to the surface of the formation.

In general it is positive for the ability of the polymer to take up water that it is not strongly cross-linked but able to be converted to a substantially linear polymer when swelled in water. This way many water molecules may be associated to the polymer chain. On the other hand the same property (low degree of cross-linking) is negative for the stability of the polymer both with respect to remaining in position within the formation and with respect to maintaining the desired properties, such as viscosity and general chemical stability with respect to chemical influences from the environment.

With regard to polymers of negatively charged ions these have a significant disadvantage in the form of insufficient swellability in environments where salts or acids are present. The same may be said, though to a somewhat less extent, about polymers based on positively charged monomers. Neutral systems are influenced least by salt concentrations.

U.S. Pat. No. 5,701,955 (Framton, 1997) teaches a method and a dispersion for use to reduce water permeability in subterranean formations. The dispersion is comprised by water swellable polymer particles being produced by emulsifying polymerization of inverted (reverse) phase (water-in-oil), in which at least 90% of the particles have a size less than 10 μm. Cross-linkers are not given any particular attention in this patent. The water swellable polymer particles of this patent exhibit excellent swelling ability but the particles loose most of their stability during swelling as there are few water-stable bonds present and there is no occurrence of additional cross-linking in the swollen condition to stabilize the particles.

U.S. Pat. No. 6,454,003 B1 and the US patent applications NOs. 2003/0116317 A1, 2003/0149212 A1 and 2003/0155122 A1 (Chang et al.) teach the production of water swellable polymer particles produced in a reverse-phase emulsion polymerization. The particle swelling occurs upon breakage of labile cross-linking bonds initiated by pH change and increased temperature in an aqueous phase. Two types of cross-linkers ensure that swelling does not occur until the particles have reached the desired location in the formation but do not influence or increase the stability of the system as swelled. Furthermore the method described by Chang (water-in-oil) can not be used to capsulate solid, water soluble components with the object of later formation of a stable system, since the water soluble components would be dissolved in the discontinuous phase (water) during the particle formation involving chemical reactions already during the particle production. The desired reactions should only take place subsequent the placement in the subterranean formation and such systems can only be produced in oil-in-oil emulsion systems. A main object of the present invention is the formation of a stable, particle based system enduring high pressures and temperatures and in which the resulting water swelled system is held in place and remains pressure and temperature stable while blocking water (minimizing water permeability) by chemical reactions taking place subsequent to the system having been placed in the formation and has come into contact with formation water.

PCT patent application with publication No. WO A1 02/40828 describes a system which is based on cross-linked hydrophilic particles manufactured in a water-in-oil based emulsion process with subsequent polymerization to solid particles. The particles comprise water soluble scale inhibitors (dissolved in the discontinuous phase, water, during manufacture) and the particles are evenly distributed in a sand screen around the production well. When water is produced, the scale inhibitor is released from the particles in contact with water. The particles have a high degree of cross-linking and portion matrix as the particles are not to be deformed when the inhibitors have been released but maintain their form ad location as part of the sand screen. No gelling or water blocking is described or mentioned as desired according to this publication. The particles constitute an amount of only 10% of the volume of sand screen and the permeability is maintained. WO A1 02/40828 describes chelating (complex forming) chemicals like AMPS, vinyl phosphoric acid derivatives etc. since these molecules have scale inhibiting properties. It is these properties that are used according to this publication.

PCT patent application WO A1 02/14453 describes a method for stabilizing porous sand formations for a limited period of time to allow drilling and subsequent casing with a steel casing in the well without well cave-in (collapse). The method according to this publication makes use of chemicals to glue together sand grains in the formation but the process is not supposed to reduce the permeability of the formation. The chemicals used shall provide adhesion between sand particles present without blocking pores. WO A1 02/14453 does not describe an agent or a method for reducing or eliminating permeability. It is therefore not suitable for water blocking or the like. WO A1 02/14453 furthermore describes a system which over time is supposed to degrade and in which the components from the degradation process or substances added during the "placing process" are supposed to control reservoir phenomena like wax, scale, hydrates and moisture properties.

U.S. Pat. No. 6,169,058 B1 concretely concerns fracturing of subterranean formations using liquids of high viscosity. The viscosity of the liquids is controlled by addition of a per se known viscosity increasing agent. Furthermore the water swellable, hydrophilic polymer particles used are cross-linked and therefore not water soluble. The patent is not directed towards the particles as such. The primary object of the polymer particles is to reduce loss of fluids such as circulating drilling fluids in the formation.

PCT patent application with publication No. WO 98/06929 describes a method and a composition for reducing water permeability in subterranean formations. The composition is based on at least a vinyl amide monomer of a certain formula, a monomer comprising ammonium or quaternary ammonium units as well as a cross-linking monomer. The method involves injecting the particles into the formation in question by means of a carrier fluid and an inverting surfactant, the particle size being assumed to be of a magnitude less than the pore size of the formation. Zwitterionic monomers are not mentioned. It is clearly emphasized in this publication and the examples that the swellable particles are manufactured in an inverted (water-in-oil) polymerization process.

Even though many agents and methods have been described in the literature to shut off water in permeable zones in subterranean formations, there is still a need for new systems which are improved in the sense that they are better suited for all types of environments, not dependent upon depth, temperature, the rock species, acid or salt concentrations and which are able to meet any requirements of delaying the swelling process and in which the particle size during production can be adapted to the pore size or the permeability of the formation in question.

OBJECTS

It is thus an object to provide a generally useful and environmentally friendly polymer based agent which renders it possible to eliminate or reduce the water flow through high permeable zones in subterranean formations, as well as a generally useful method therefore. The system should not be significantly influenced by concentrations of salt and acid in the formation and should largely be temperature independent.

It is furthermore an object to provide an agent as mentioned above which is stable and maintains reduced permeability for an extended period of time without being deteriorated or influenced by outer conditions like washing-out, salinity, pH, pressure or temperature.

A further object of the invention is to provide a method for the manufacture of an agent as mentioned above and which allows the agent to remain stable until being used.

THE PRESENT INVENTION

The present invention concerns according to a first aspect an agent as defined by claim 1.

According to a second aspect the present invention concerns a method for the manufacture of the agent according to the first aspect of the invention as defined by claim 19.

According to a third aspect the present concerns a method for reducing water production from subterranean zones that surround oil or gas wells as defined by claim 24.

Preferred embodiments of the invention are disclosed by the dependent claims.

According to the present invention a polymer system and a method which are useful in most environments and hydrocarbon reservoirs are provided.

According to a first aspect the present invention concerns a chemical agent in the form of a polymer particle system which is manufactured in an oil-in-oil emulsion. The polymer particles can be manufactured by means of a free radical polymerization process or a step polymerization (often also denoted condensation polymerization). By using an oil-in-oil emulsion water reactive monomers (mono functional, poly functional) can be used while avoiding contact between particles and water.

The polymer cross-linked particles have a skeleton chosen among functionalized homo and copolymers of compounds chosen among, but not restricted to, methacrylates, acrylates, acryl amides, vinyl alcohols, alginates, chitosan, xanthan, dextrans, gelatine, cellulose, amylose, biopolymers in general, vinyl pyrrolidone, vinyl sulfonates, derivatized polyethylene glycols, siloxanes, isocyanates, lactones and epoxides, and where these types of compounds are functionalized with hydroxyl, vinyl, primary, secondary, tertiary or quaternary amines, carboxylic acids, acryl, methacrylate, sulfonic acids, hydroxy succinimides, anhydrides, esters, lactones, azalactones, epoxides or thiols.

The polymer particles are mainly hydrophobic until the reaction between water and water-labile crosslinkers has taken place.

The chemical agent according to the present invention can have many different forms such as in solution, optionally concentrated in the form of a masterbatch of said particles in a suitable organic solvent or in a mainly dry condition.

Water soluble, solid particles with specific properties are immobilized in the emulsified phase (discontinuous phase) during the emulsifying step. These chemical compounds will later, when contacted with water (in the reservoir) due to the swelling of the polymer particles, initiate reactions that facilitate reactions (bonds) between the particles (interparticulate bonds) or bonds between particles and the formation.

The mentioned compounds can be, but are not limited to, borates that by means of reactions with vicinal hydroxyl groups, which are components of the particle matrix, lead to bonds between particles and to silanol groups or to other hydroxyl groups in the formation. In the same manner borates, like boric acid, can react with hydroxyl groups which are components of monomer units constituting links of polyvinyl alcohol (water soluble polymer). Another example is the use of 2-aminoethyl methacrylate hydrochloride as co-monomer (about 1-5% by weight) together with water-stable cross-linker methylene bis-acrylamide (1% by weight) and dimethacrylic anhydride. If diepoxy functionalized polyethylene glycols or biopolymers with epoxy groups are immobilized, cross-linking internally in the particles and between particles is initiated when water splits the labile cross-linking bonds and contacts the immobilized compounds. Generally all kinds of water soluble compounds comprising at least 2 functional groups able to react with another functional group of the particle matrix can be used. Examples of such reactive "pairs" are epoxy-amine, epoxy-thiol, epoxy-OH, ester-amine, ester-OH, amine-lactone, amine-azalactone, amine-maleimide, amine-aldehyde, and amine-anhydride.

The immobilized compounds thus includes preferred water soluble compounds comprising functional, reactive groups chosen among epoxy, amine, thiol, OH, ester, lactone, azalactone, maleimide, aldehyde, and anhydride. Other examples of suitable immobilized compounds are derivatives of phosphonates, borates, reactive polyvinyl alcohols, reactive polysaccharides based on derivatives of gelatine, chitosan, alginate, cellulose, amylose, dextran, and xanthan; functionalized reactive synthetic polymers of polyethylene glycols, polyacryl amides, polyacrylates, polymethacrylates, polyzwitter ions, peroxides, azo initiators, persulfates, siloxanes or sodium silicates.

Said compounds are intended to serve as examples and should not be seen as limiting with respect to the present invention.

The immobilized chemical compounds which can be only a specific compound or a combination of several compounds can also be tailor-made to provide an increased swelling and gelling effect while at the same time contribute to the formation of a stronger network within each swelled particle. In order for the system to function water must contact the immobilized reagents. This is achieved by forming the particles by polymerization of a mixture of oil soluble monomers and at least 2 different oil soluble cross-linkers of which at least one is water-labile, such as e.g. dimethacylic anhydride, diacrylic anhydride or methylene dimethacrylate. The polymer particles are, when injected into the reservoir, oil dispersible and hydrophobic but after having been contacted by water in permeable zones, the water-labile cross-linking bonds are broken. The chemical reaction taking place also introduces chemical groups (by conversion of the existing functional groups) which are highly hydrophilic and which contribute to swelling of the polymer particles. In the case of the three above mentioned compounds the carboxylic groups are converted by the hydrolysis initiated by water. The fraction of water-stable cross-linkers must be controlled and held on a low level (0.05 to 10% by weight of total amount of monomer) to prevent insufficient swelling of the particles. A more preferred range of such cross-linker is from 0.05 to 2% by weight.

The degree of cross-linking in swelled particles can be increased by allowing immobilized compounds like e.g. polyamines to react with epoxy groups which are introduced with the different monomers used in the manufacture of the polymer particles. The principle is described above, but then with the purpose of forming interparticulate bonds and bonds to the formation, but corresponding compounds will at the same time lead to increased stability with respect to temperature and mechanical influence. Bonds to the formation can be formed as described above but in addition such bonds may be initiated by use of for example different alkoxy siloxanes (monomer) where the alkoxy groups are hydrolysed in an aqueous environment resulting in silanols which form bonds e.g. to different types of quartz. Immobilized compounds can be of a character such that they initiate a free radical polymerization reaction between surface reactive groups like vinyl, allyl, acryl, methacrylate, etc on the particle surface so that covalent bonds are formed between these groups. Examples of such compounds can be water soluble azo initiators (V-50), persulfates ad peroxides.

According to a preferred embodiment the at least one immobilized compound comprises a biopolymer with a epoxy group amino group, thio group or free radical polymerizable group such as e.g. vinyl, allyl.

According to a preferred embodiment the immobilized compound is chosen so as to contribute to increased swelling or gelling, such as for example polymers of 2-acrylamido propane sulfonic acid, chitosan, poly n-acryloyltris(hydroxymethyl)aminomethane (NAT) and amino functionalized gelatine.

According to yet another embodiment the at least immobilized compound is chosen among amino functionalized polyethylene glycols like JEFFAMINE® 1000 (product of Huntsman, The Woodlands, Tex., USA), JEFFAMINE® 2000 (product of Huntsman, The Woodlands, Tex., USA) and chitosan, whereby the immobilized compound contributes to increased degree of cross-linking.

According to yet another preferred embodiment the at least one immobilized compound comprises alkoxy silanes which by means of hydrolysis are converted to silanols which are able to form bonds to compounds like quartz.

According to still another preferred embodiment the at least one immobilized compound is chosen among sodium silicate, tetraethyl othosilicate and tetramethyl siloxane which are able to initiate reaction and cause interparticulate bonds and/or bonds between particles and the formation to be established.

Non-limiting examples of labile cross-linking bonds are anhydrides (diacrylic anhydride, dimethacrylic anhydride), diesters, (dimethacrylic acid methylene ester, dimethacrylic acid ethylene ester), diimodo esters, dihydroxy succinimides like ethylene dihydroxy succinimide and different difunctional disulfides.

The advantage of the present invention compared to other patented methods which only provide swelling, is i.a. that the particles have a high swelling ability without being water soluble. The latter property implies that the agent maintains its structural integrity and remains in position in the formation after swelling. At the same time the agent is chemically and thermally stable and the rate with which it initially swells when contacted by water can be adjusted by means of a chosen balance between stable and labile cross-linking bonds. It is thus avoided that the agent swells prematurely, i.e. before it has reached its desired position in the formation. The first swelling of the agent in water leads to opening of cross-linking bonds so that hydrophilic seats in the particles become available which again leads to gradually increase rate of swelling of the particles, once initiated. By desired amount and combination of immobilized compounds the agent's properties can be further optimized, e.g. to form interparticulate bonds, i.e. bonds between different particles, which also contributes to the stability of the agent in relation to influence imposed in the formation subsequent to the swelling. Said features, characteristics and effects contribute to increased stability with respect to temperature, pressure, back-production, washing-out, as well as chemical (salinity, pH) and mechanical influence. Such immobilized compounds with properties as mentioned can only be included in a water-free environment which is why the manufacture in an oil-in-oil emulsion is imperative.

According to the second aspect of the invention the agent is manufactured in an oil-in-oil emulsion polymerization, i.e. an emulsion polymerization free from water. Thereby it is ensured that the agent does not swell prematurely or lead to an early reaction involving solid immobilized compounds, but remains stable until introduced into the formation and contacted by water for the first time. The polymerization can be a free radical polymerization but also a condensation polymerization.

The agent can thus be manufactured in a water-free environment in a way with which it allows different chemical compounds to be immobilized thereon, which at a given point in time, in contact with water can contribute to the formation of chemical interparticulate bonds and bonds between particles and the reservoir formation. Said bonds will contribute to a ore stable system which maintains the reduced permeability for a long period of time while the system as mentioned becomes more robust in relation to external influence.

The third aspect of the invention is a method with which the chemical agent by means of injection into a subterranean zone reduces the water production from a water permeable zone. The agent is typically introduced in the formation by means of a suitable carrier fluid, preferable an organic carrier fluid lacking groups like aliphatic or aromatic hydrocarbons or combinations of such together with other hydrophobic, organic solvents which do not comprise thiols, amines or hydroxyl groups.

The invention claimed is:

1. A chemical agent for reducing water production from subterranean zones surrounding oil and gas wells, the chemical agent comprising polymeric, cross-linked particles which are stable in water-free solvents, wherein:
   a) the particles are manufactured in an oil-in-oil emulsion and are cross-linked with at least one water-stable cross-linker and at least one water-labile cross-linker, the water-labile cross-linker being chosen among cross-linkers able to, when opened in a reaction with water, form a hydrophilic seat which increases the particles' water-swelling ability, and that
   b) the particles comprise at least one solid, water soluble immobilized chemical compound that, by means of the reaction between the labile cross-linker and water, forms a new chemical bonding to another particle, to another reactive seat in the same particle, or to other of said immobilized chemical compounds.

2. The chemical agent as clamed in claim 1, wherein:
   the polymer cross-linked particles have a skeleton selected from the group of compounds consisting of functionalized homo and copolymers of methacrylates, acrylates, acrylamides, vinyl alcohols, alginates, chitosan, xanthan, dextrans, gelatine, cellulose, amylose, biopolymers in general, vinyl pyrrolidone, vinyl sulfonates, derivatized polyethylene glycols, siloxanes, isocyanates, lactones and epoxides; and
   the compound for said skeleton is functionalized from a compound selected from the group consisting of hydroxyl, vinyl, primary, secondary, tertiary or quaternary amines, carboxylic acids, acryl, methacrylate, sulfonic acids, hydroxy succinimides, anhydrides, esters, lactones, azalactones, epoxides and thiols.

3. The chemical agent as claimed in claim 1, wherein 2-aminoethyl methacrylate hydrochloride is used as a copolymer in an amount of 1-5% by weight of the total amount of polymer, together with a water stable cross-linker methylene bis-acrylamide and dimethacrylic anhydride.

4. The chemical agent as claimed in claim 1, wherein the water-labile cross-linker is selected from the group consisting of anhydrides, diesters, diimodo-esters, dihydroxy succinimides and difunctional disulfides.

5. The chemical agent as claimed in claim 1 wherein the at least one water-labile cross-linker comprises at least one of dimethacrylic anhydride, diacrylic anhydride and methylene dimethacrylate, in which the carboxylic acid groups are formed by reaction with water.

6. The chemical agent as claimed in claim 1 wherein the water-labile cross-linker is present in an amount of from 0.05 and 10% by weight of the total amount of monomer.

7. The chemical agent as claimed in claim 1, wherein the at least one immobilized compound is a compound having a reactive group selected from the group consisting of epoxy, amine, thiol, OH, ester, lactone, azalactone, maleimide, aldehyde, and anhydride.

8. The chemical agent as claimed in claim 1, wherein the at least one immobilized compound is selected from the group consisting of derivatives of phosphonates, borates, reactive polyvinyl alcohols, reactive polysaccharides based on derivatives of gelatine, chitosan, alginate, cellulose, amylose, dextran, and xanthan; functionalized reactive synthetic polymers of polyethylene glycols, polyacryl amides, polyacrylates, polymethacrylates, polyzwitter ions, peroxides, azo initiators, persulfates, siloxanes and sodium silicates.

9. The chemical agent as claimed in claim 8, wherein the functionalized, reactive synthetic polymers of polyethylene glycols are selected from the group consisting of diepoxy functionalized polyethylene glycols, diamino functionalized polyethylene glycols, dithio functionalized polyethylene glycols and divinyl functionalized polyethylene glycols.

10. The chemical agent as claimed in claim 8, wherein the at least one immobilized compound comprises at least one biopolymer with an epoxy group, amino group, thio group, or free radical polymerizable group.

11. The chemical agent as claimed in claim 1, wherein the at least one immobilized compound is selected from the group consisting of polymers of 2-acrylamido propanesulfonic acid, chitosan, poly n-acryloyltris(hydroxymethyl) aminomethane (NAT) and amino functionalized gelatine.

12. A chemical agent as claimed in claim 1, wherein the at least one immobilized compound is an amino functionalized polyethylene glycol.

13. The chemical agent as claimed in claim 1, wherein the at least one immobilized compound comprises alkoxy silanes which by means of hydrolysis are converted to silanols.

14. The chemical agent as claimed in claim 1, wherein the immobilized chemical compound by means of the reaction between the labile cross-linker and water forms a new chemical bonding to compounds in a subterranean formation in which the polymer system is used.

15. The chemical agent as claimed in claim 1, wherein the at least one immobilized compound is selected from the group consisting of sodium silicate, tetraethyl orthosilicate and tetramethyl siloxane.

16. The chemical agent as claimed in claim 1, wherein the polymer particles are mainly hydrophobic until the reaction between water and water-labile cross-linkers has occurred.

17. The chemical agent as claimed in claim 1, wherein it has form of a masterbatch or a concentrate of said particles in a suitable organic solvent.

18. The chemical agent as claimed in claim 1, wherein it has the form of said particles in dry conditions.

19. The chemical agent as claimed in claim 1, wherein the emulsion is free from water.

20. A method for the manufacture of a chemical agent for reducing water production from oil and gas wells comprising polymeric, cross-linked particles which are stable in water-free solvents, wherein the polymeric, cross-linked particles are manufactured in an oil-in-oil emulsion of two or more different monomers, while chemical compounds which are to be immobilized in the particles without being part of their polymer skeleton, are added to the discontinuous phase of the emulsion before the polymerization takes place, to improve the pressure, temperature and localization stability of the chemical agent.

21. The method as claimed in claim 20, wherein the monomers are chosen from the group consisting of:
   functionalized homo and copolymers of methacrylates, acrylates, acrylamides, vinyl alcohols, alginates, chitosan, xanthan, dextrans, gelatine, cellulose, amylose, biopolymers in general, vinyl pyrrolidone, vinyl sulfonates, derivatized polyethylene glycols, siloxanes, isocyanates, lactones and epoxides functionalized from a compound selected from the group consisting of hydroxyl, vinyl, primary, secondary, tertiary or quaternary amines, carboxylic acids, acryl, methacrylate, sulfonic acids, hydroxy succinimides, anhydrides, esters, lactones, azalactones, epoxides and thiol;

2-aminoethyl methacrylate hydrochloride in an amount of 1-5% by weight of the total amount of polymer, together with a water stable cross-linker methylene bis-acrylamide and dimethacrylic anhydride;

anhydrides, diesters, diimodo-esters, dihydroxy succinimides and difunctional disulfides; and dimethacrylic anhydride, diacrylic anhydride and methylene dimethacrylate, in which the carboxylic acid groups are formed by reaction with water.

22. The method as claimed in claim 20, wherein the at least one immobilized compound is chosen from the group consisting of:

epoxy, amine, thiol, OH, ester, lactone, azalactone, maleimide, aldehyde, and anhydride;

derivatives of phosphonates, borates, reactive polyvinyl alcohols, reactive polysaccharides based on derivatives of gelatine, chitosan, alginate, cellulose, amylose, dextran, and xanthan; functionalized reactive synthetic polymers of polyethylene glycols, polyacryl amides, polyacrylates, polymethacrylates, polyzwitter ions, peroxides, azo initiators, persulfates, siloxanes and sodium silicates;

diepoxy functionalized polyethylene glycols, diamino functionalized polyethylene glycols, dithio functionalized polyethylene glycols and divinyl functionalized polyethylene glycols;

at least one biopolymer with an epoxy group, amino group, thio group, or free radical polymerizable group;

polymers of 2-acrylamido propanesulfonic acid, chitosan, poly n-acryloyltris(hydroxymethyl)aminomethane (NAT) and amino functionalized gelatine;

an amino functionalized polyethylene glycol;

alkoxy silanes which by means of hydrolysis are converted to silanols; and sodium silicate, tetraethyl orthosilicate and tetramethyl siloxane.

23. The method as claimed in claim 20, wherein the polymerization is a free radical polymerization.

24. The method as claimed in claim 20, wherein the polymerization is a condensation polymerization.

25. A method for reducing water production from subterranean zones surrounding oil or gas wells comprising to inject a composition comprising a chemical agent comprising hydrophobic polymer particles the subterranean zone, wherein the hydrophobic particles are manufactured in an oil-in-oil emulsion and are cross-linked with at least one water-labile cross-linker, the water-labile cross-linker being chosen among cross-linkers able to, when opened in a reaction with water, form a hydrophilic seat which increases the particles' water-swelling ability, and that the particles comprise at least one solid, water soluble immobilized chemical compound that by means of the reaction between the labile crosslinker and water is able to form a new chemical bonding to another particle, to another reactive seat in the same particle, to other immobilized compounds or to other compounds.

26. The method as claimed in claim 25, wherein the composition comprises a carrier liquid chosen among aliphatic and aromatic hydrocarbons or combinations of these as well as other hydrophobic organic solvents not comprising thiols, amines or hydroxyl groups.

27. The method as claimed in claim 25, wherein the immobilized compound or group is selected from the group consisting of diepoxy functionalized polyethylene glycols and biopolymers with an epoxy group.

* * * * *